United States Patent [19]

Lee

[11] E Re. 29,690

[45] Reissued Jul. 4, 1978

[54] PROCESS OF PREPARING GLUCOSE ISOMERASE

[75] Inventor: Chin K. Lee, Winston-Salem, N.C.

[73] Assignee: R.J. Reynolds Tobacco Company, Winston-Salem, N.C.

[21] Appl. No.: 361,546

[22] Filed: May 18, 1973

Related U.S. Patent Documents

Reissue of:

[64] Patent No.: 3,645,848
Issued: Feb. 29, 1972
Appl. No.: 877,474
Filed: Nov. 17, 1969

U.S. Applications:

[62] Division of Ser. No. 877,474, Nov. 17, 1969, Pat. No. 3,645,848.

[51] Int. Cl.[2] ..... C12D 13/00; C12D 13/10

[52] U.S. Cl. ..... 195/31 F; 195/65; 195/66 R

[58] Field of Search ..... 195/31 F. 65, 66 R

[56] References Cited

U.S. PATENT DOCUMENTS 3,345,269 10/1967 Hofsten ..... 195/66 R

*Primary Examiner*—Lionel M. Shapiro
*Attorney, Agent, or Firm*—Neuman, Williams, Anderson & Olson

[57] ABSTRACT

Glucose is converted to fructose in the presence of an enzyme preparation derived from a member of the genus Arthrobacter.

16 Claims, No Drawings

PROCESS OF PREPARING GLUCOSE ISOMERASE

Matter enclosed in heavy brackets [ ] appears in the original patent but forms no part of this reissue specification; matter printed in italics indicates the additions made by reissue.

*This application is a division of Ser. No. 877,474, filed Nov. 17, 1969, now U.S. Pat. No. 3,645,848. Other divisional reissue applications are Ser. No. 361,544 and 361,548, both filed May 18, 1973 and Ser. No. 653,062, filed Jan. 28, 1976.*

This invention relates to a process for converting aldoses to ketoses utilizing enzymes obtained from micro-organisms. More specifically, this invention relates to a method for isomerizing aldoses such as glucose and xylose to the corresponding ketose forms using enzymes produced by bacterial cells.

Fructose is generally regarded as the sweetest of the sugars and syrups containing increased proportions of fructose have a corresponding increased sweetness. In view of the ready availability of glucose, the desirability of finding a practical and economic method for the isomerization of glucose to fructose is obvious. The alkaline isomerization of glucose to fructose has been widely investigated but has not been economically feasible due, primarily, to the relatively low conversion and undesired byproducts which are obtained therefrom. An alternative method of effecting the desired transformation has been the utilization of enzymes and considerable efforts have been expended by those skilled in the art to find suitable enzymes which will convert glucose to fructose in a simple, efficient and economical manner.

Although several enzyme preparations are known which will convert D-glucose to D-fructose and which involve one or more chemical intermediates (e.g., D-glucose-6-phosphate), the most promising enzymes appear to be those which promote the direct conversion of D-glucose to D-fructose (i.e., the isomerases). Such isomerase preparations have been obtained from a number of micro-organisms including the genera Lactobacillus, Pseudomonas, Pasteurella, Leuconostoc, Streptomyces and Aerobacter. A recent, brief literature review relating to this subject matter is given by Yamanaka in Biochim, Biophys. Acta 151, 670–680 (1968). A close examination of the prior art reveals that production of significant isomerase activity has consistently been associated with the presence of xylose or xylan in the growth medium of the organism. Moreover, the presence of arsenate salts in the isomerization mixture is often required in order to obtain significant conversion of the aldose to the ketose.

The critical role of xylose or xylan in the microbial production of isomerase activity is exemplified by the following representative references. Isomerization of D-glucose to D-fructose using an enzyme preparation obtained from Pseudomonas hydrophila was disclosed by Marshall and Kooi in Science 125, 648–649 (1957) and in U.S. Pat. No. 2,950,228; however, D-xylose was required in the growth medium in order to obtain the desired enzyme activity and the addition of arsenate, arsenite or fluoride ions to the reaction medium was necessary for maximum yields of D-fructose. Japanese Pat. No. 7431('66) (corresponding to British Pat. No. 1,103,394) discloses a method for producing a glucose-isomerizing enzyme by cultivating members of the genus Streptomyces in a xylan-containing medium. Related methods utilizing Streptomyces bobiliae are described in Japanese Pat. Nos. 7428('66) and 7430('66). Tsumura and Sato [Agr. Biol. Chem. 25, 616–625 (1961)] isolated a strain of Aerobacter cloacae which produced small amounts of glucose-isomerizing enzymes when grown in glucose or fructose culture media, but greatly enhanced formation of such enzymes occurred when xylose was present in the growth medium.

It has now been discovered that *certain* micro-organisms belonging to the diphtheroidic genus Arthrobacter are capable of producing an isomerase which effects the direct conversion of either D-glucose or D-xylose to the corresponding ketose. *These microorganisms are Arthrobacter nov. sp. NRRL B-3726 and NRRL B-3727.* Production of an isomerase by Arthobacter has not been reported heretofore. Furthermore, it has been found that aldose isomerization effected by an Arthobacter-produced enzyme will proceed in the absence of arsenate or arsenite and that the concentration of the aldose in the isomerization medium is not critical. The enzyme shows unusual properties in that temperatures as high as 80°–90° C. can be used in the isomerization without a significant loss in enzyme activity. The presence of divalent cations is beneficial as shown by the improved activity of the enzyme in the presence of magnesium ions.

A particularly surprising aspect of this discovery is the finding that certain of the Arthrobacter strains isolated are capable of producing comparable amounts of the isomerase enzyme utilizing glucose instead of xylose as the sole carbohydrate source in the growth medium [Whereas all] *All* of the strains disclosed herein are able to produce the isomerase in the presence of xylose or xylan [three of the strains (Arthrobacter nov. sp. NRRL B-3726, NRRL B-3727, NRRL B-3728)] *and are also* are capable of producing the isomerase in the complete absence of xylose and xylan.

The general morphological characteristics of the organisms disclosed herein are: Rods, irregular in shape and size, generally 0.5 to 0.7 micron by 1.0 to 3.0 microns, occurring in angular and palisade arrangement. Cells may be straight, curved, or bent, frequently clubbed or swollen with rudimentary branching. Coccoid cells, 0.6 to 1.0 micron in diameter and occasionally large spheres up to 3.0 microns in diameter occur in older cultures. On transfer to fresh medium, coccoid cells undergo morphological changes giving rise to rod forms. Cells are nonmotile. Early cells are gram-negative, many with gram-positive granules. Most older rods and coccoid forms are gram-positive but a few gram-negative cells may also be found.

Stock cultures are maintained on Nutrient Agar (Difco) and are generally cultivated in a medium containing sources of carbon, nitrogen and inorganic salts. The carbon source chosen is dependent upon the particular strain selected. Additionally, a yeast extract, a protein source (e.g., tryptone) and sources of phosphate, ammonium and magnesium ions may be included in the medium for enrichment. A typical inoculum medium contains diammonium hydrogen phosphate, potassium dihydrogen phosphate, magnesium sulfate, a brewers' yeast fraction, hydrolyzed animal protein and the carbon source. The inoculum may be prepared by growing the organism in the medium on a rotary shaker at approximately 20° to 35° C. and preferably 25° to 30° C. in the presence of air from 1 to 3 days during which time good growth occurs.

The glucose-isomerizing enzyme of this invention is obtained by transferring the inoculum to a sterile medium containing sources of carbon, nitrogen and inorganic salts. Glucose is preferred as the carbon source [when utilizing strains such as the three mentioned previously. For other strains such as NRRL B-3724 and NRRL B-3725, xylose or xylan is preferred. It is to be understood that materials containing the desired carbohydrate (such as starch or cellulose hydrolysates) may also be employed]. The particular carbon source chosen will be determined largely by economic factors. In any case, the inoculated medium may be incubated with agitation in a suitable fermentor at about 25°-30° C. while maintaining an airflow of approximately 0.015 cubic foot per minute per gallon. Maximum isomerase activity levels are normally attained under these conditions after about 50-60 hours. Activity levels of approximately 120 microunits per milliliter of culture broth have been reached within about 15 hours. A microunit of activity is defined as that quantity of enzyme which will produce 1 microgram of fructose from glucose in 1 minute at 60° C. using 1 M glucose in 0.1 M phosphate buffer at pH 7.0 and containing 0.01 M magnesium chloride. The whole cells are then harvested and used as such or, alternatively, the enzyme may be extracted from the cells using techniques known to the art. It will be apparent that the conditions and techniques for maintaining the organism and effecting the production of an isomerase enzyme may vary substantially without impairing the overall success of the process. Such variations will be obvious to those skilled in the art.

The isomerase activity levels obtainable in the practice of this invention vary, depending on the particular strain employed and the growth media. Activity levels of at least 800 microunits per milliliter of culture broth have been observed in the [cases] *case* of NRRL B-3726 [and NRRL B-3728] grown in a glucose medium. [Suitable activity levels are also obtained with Arthrobacter nov. sp. NRRL B-3724 and NRRL B-3725 grown in a xylose or xylan medium.]

The isomerization of glucose to fructose may be effected by using either the whole cells or cell-free extracts from the selected strains. The pH of the isomerization medium may vary from about 6 to 10 with optimum activity occurring at approximately pH 8. The operable temperature range is approximately 50° to 90° C. with the preferred range being about 60° to 75° C. The enzyme activity is enhanced by the addition of small quantities of divalent cations such as magnesium ions. The initial substrate for the conversion may consist of pure glucose or, more preferably, a high dextrose equivalent (D.E.) corn syrup. The conversion yields a final mixture of glucose and fructose which contains approximately equal concentrations of each. The time required to reach equilibrium is, of course, dependent on pH, temperature and the concentrations of glucose and the glucose-isomerizing enzyme. [The effects of temperature and pH on the conversion of glucose are shown in tables 1 and 2. The enzyme used for these studies was derived from the NRRL B-3724 organism. The data in table 1 were obtained using an isomerization medium containing 1.0 M glucose, 0.1 M phosphate buffer and 0.01 M magnesium chloride at pH 7.0. Data in table 2 were obtained using an isomerization medium containing 1.0 M glucose, 0.01 M magnesium chloride and a 0.1 M phosphate or glycine-sodium hydroxide buffer at 60° C. The quantities of fructose shown in both tables have been corrected for any amounts resulting from nonenzymatic conversion of glucose. Although enzyme activity is still significant at 80° C. (see table 1), conducting the isomerization at temperatures higher than about 80° C. results in a significant increase in side reactions such as thermal degradation of the fructose.]

[TABLE 1

Effect of Temperature on Glucose-Isomerizing Enzyme from NRRL B-3724 in 1.0 M Glucose at pH 7.0

| Temperature, ° C. | mg. fructose formed per minute per 10 mg. of enzyme |
|---|---|
| 50 | 8 |
| 60 | 94 |
| 65 | 140 |
| 70 | 210 |
| 75 | 270 |
| 80 | 290 |

]

[TABLE 2

Effect of pH on Glucose-Isomerizing Enzyme from NRRL B-3724 in 1.0 M Glucose at 60° C.

| pH | mg. fructose formed per minute per 15 mg. of enzyme |
|---|---|
| 6.0 | 50 |
| 6.5 | 100 |
| 7.0 | 150 |
| 7.5 | 210 |
| 8.0 | 230 |
| 8.5 | 240 |
| 9.0 | 240 |
| 10.0 | 240 |

]

The following illustrative examples are given to describe the application of the invention in more detail. They define ways in which the proved process may be carried out but are not to be construed as limiting in any manner. It is to be understood that in the practice of the improved process of this invention, limitation to the particular Arthrobacter strains disclosed herein is not intended. It is specifically desired and intended to include subcultures, natural mutants, transduced derivatives, variants and the like, as well as mutants artificially produced from the aforesaid organism by means such as irradiation with X-rays or ultraviolet light, treatment with chemical agents, and the like.

In the following examples the meat protein referred to as O.M. HAP is an enzyme-hydrolyzed animal protein preparation available from Amber Laboratories in Juneau, Wisconsin (Zip Code 53039). The yeast extract listed in the examples as BYF-100 is a water-soluble brewers' yeast fraction which is also available from Amber Laboratories. The Bacto-Tryptone is a commercial animal protein preparation obtained from Difco Laboratories in Detroit, Michigan (Zip Code 48201). The Bacto Yeast Extract and Nutrient Agar are also commercial preparations available from Difco Laboratories. The terms glucose and dextrose in the examples and elsewhere in this application are used interchangeably and refer to what is known in the art as D-glucose. Fructose is synonymous with levulose and refers to what is known in the art as D-fructose.

EXAMPLE 1

Arthrobacter nov. sp. NRRL [B-3728] *B-3726,* was rinsed from a Nutrient Agar petri plate in which the Nutrient Agar was supplemented with 0.01% $MgSO_4 \cdot 7H_2O$ and 0.5 percent dextrose. The growth was rinsed from the plate (under sterile conditions) into 500 ml. Erlenmeyer flasks containing 100 ml. of the following aqueous inoculation medium (the medium was previously sterilized in an autoclave for 20 minutes at 121° C.):

| | grams/liter |
|---|---|
| Dextrose | 20.0 |
| Meat Protein (O.M. HAP) | 3.0 |
| Yeast Extract (BYF-100) | 1.5 |
| $(NH_4)_2HPO_4$ | 6.0 |
| $KH_2PO_4$ | 2.0 |
| $MgSO_4 7H_2O$ | 0.1 |

The flasks were incubated on a rotary shaker at 30° C. for 24 to 48 hours during which time considerable growth occurred. This inoculum was used in the subsequent enzyme production step.

The glucose-isomerizing enzyme production medium was prepared and sterilized in a 166-liter fermentation vessel by heating for 1 hour at 121° C. This aqueous medium contained the following components:

| | grams/liter |
|---|---|
| Meat Protein (O.M. HAP) | 6.0 |
| Yeast Extract (BYF-100) | 1.5 |
| $(NH_4)_2HPO_4$ | 6.0 |
| $KH_2PO_4$ | 2.0 |

To this sterile medium was added a previously sterilized solution (121° C. for 20 minutes) containing dextrose and $MgSO_4 \cdot 7H_2O$ in sufficient amounts to give a final dextrose concentration of 2 percent and a final $MgSO_4 \cdot 7H_2O$ concentration of 0.01 percent. The pH of the resulting medium was about 6.9.

The sterile enzyme production medium (total volume, 113 liters) was cooled to 30° C. and to it as added 1 liter of the previously prepared inoculum. The fermentation was allowed to proceed at 30° C. while air was introduced at the rate of 0.015 cubic foot per gallon of broth per minute and while the medium was agitated at 300 r.p.m. After [55] *63* hours it was found by standard assaying methods that the cells contained isomerase activity of approximately [800] *850* microunits/milliliter. The pH of the medium was 5.6. The cells were then harvested by centrifugation and were frozen at −5° C.

The glucose isomerization was carried out by adjusting at 95 D.E. corn syrup (32–35 percent solids) to pH 7.5. To the syrup were added 20 grams (net weight) of the harvested cells and 2 grams of $MgSO_4 \cdot 7H_2O$ for each liter of syrup. The syrup was incubated for 26 hours at 60° C. after which time it was found to contain [41] *46* percent fructose based on the total weight of the solids.

[EXAMPLE 2]

[The procedure of example 1 was repeated except that a different strain, Arthrobacter nov. sp. NRRL B-3726, was substituted for the Arthrobacter nov. sp. NRRL B-3728. An isomerase activity of approximately 850 microunits/milliliter was obtained after 63 hours. The glucose conversion resulted in a 46 percent fructose syrup after a 26-hour incubation at 60° C.]

EXAMPLE [3] *2*

The procedure of Arthrobacter 1 was repeated except that the strain Arthrobacter nov. sp. NRRL B-3727 was substituted for the NRRL [B-3728] *B-3726* organism. Isomerase activity of approximately 400 microunits/milliliter was obtained after 64 hours. A syrup containing 38 percent fructose resulted from the glucose isomerization.

[EXAMPLE 4]

[Arthobacter nov. sp. NRRL B-3724 was rinsed from a Nutrient Agar slant into 500-ml. erlenmeyer flasks containing 100 ml. of the following aqueous inoculation medium, the medium having been previously sterilized by autoclaving for 20 minutes at 121° C.]

| | grams/liter |
|---|---|
| Xylose | 20.0 |
| Bacto-Tryptone | 5.0 |
| Bacto Yeast Extract | 1.0 |
| $(NH_4)_2HPO_4$ | 6.0 |
| $KH_2PO_4$ | 0.2 |
| $MgSO_4 7H_2O$ | 0.25 |

The pH of the medium was adjusted to 6.9 by the addition of phosphoric acid. The flasks were then incubated on a rotary shaker at 30° C. for 64 hours after which time an isomerase activity level of approximately 600 microunits/milliliter was indicated. The cells were harvested by centrifugation.

The harvested cells were then incubated in a 2.0 M glucose solution at 60° C. (pH 7.5) using 2 grams of wet cells per liter of solution. Magnesium chloride was added in sufficient amounts to give a 0.01 M concentration. AFter 24 hours of incubation time, an assay of the solution revealed the presence of fructose to the extent of approximately 38 percent.

[EXAMPLE 5]

[The procedure of example 4 was repeated except that a xylan-containing material (corn hulls) was substituted for the xylose in the fermentation medium. The isomerization was carried out at 60° C. for a period of time to give measurable quantities of fructose.]

[EXAMPLE 6]

[The procedure of example 4 was repeated except that Arthrobacter nov. sp. NRRL B-3725 was substituted for the NRRL B-3724 organism. The isomerization was conducted at 60° C. for a period of time to give measurable quantities of fructose.]

EXAMPLE [7] *3*

The procedure of example [2] *1* was followed until the cells had been harvested by centrifugation. The cell mass was treated with 1 milligram of lysozyme per gram of cells and the resulting mixture was incubated at 50° C. for 90 minutes. The cells were then subjected to sonic treatment for 4 minutes and the cell debris was removed by centrifugation. The supernatant fraction was treated with equal volumes of acetone at −10° C. for 10 minutes. The resulting precipitate was collected by filtration.

A 95 D.E. corn syrup containing 0.2% $MgSO_4 \cdot 7H_2O$ and approximately 580 mg/liter of the precipitated enzyme preparation obtained above was incubated at 60° C. for 12 hours to yield a syrup containing 40 percent fructose.

What is claimed is:

1. A process for preparing a glucose-isomerizing enzyme which comprises inoculating a carbohydrate-containing nutrient medium with [a micro-organism belonging to the genus Arthrobacter] *the micro-organism Arthrobacter nov. sp. NRRL B-3726 or NRRL B-3727* maintaining the inoculated medium for a period of time under conditions suitable for production of said enzyme by said organism and recovering said enzyme.

2. A process according to claim 1 in which said carbohydrate is xylose.

3. A process according to claim 1 in which said carbohydrate is xylan.

4. A process according to claim 1 in which said carbohydrate is glucose.

5. A process according to claim 2 in which the microorganism is Arthrobacter nov. sp. [NRRL B-3724 or NRRL B-3725 or] NRRL B-3726 [or NRRL B-3727 or NRRL B-3728].

6. A process according to claim 3 in which the microorganism is Arthrobacter nov. sp. [NRRL B-3724 or NRRL B-3725 or] NRRL B-3726 [or NRRL B-3727 or NRRL B-3728].

7. A process according to claim 4 in which the microorganism [in] *is* Arthrobacter nov. sp. NRRL B-3726 [or NRRL B-3727 or NRRL B-3728].

8. A process for converting glucose to fructose which comprises incubating a glucose-containing liquor with a glucose-isomerizing enzyme derived from [a microorganism belonging to the genus Arthrobacter] *the micro-organism Arthrobacter nov. sp. NRRL B-3726 or NRRL B-3727* and recovering a fructose-containing liquor.

9. A process according to claim 8 in which said enzyme is derived from [an] *said* Arthrobacter microorganism grown in a nutrient medium containing xylose.

10. A process according to claim 8 in which said enzyme is derived from [an] *said* Arthrobacter microorganism grown in a nutrient medium containing xylan.

11. A process according to claim 8 in which said enzyme is derived from [an] *said* Arthrobacter microorganism grown in a nutrient medium containing glucose.

12. A process according to claim 8 in which the incubation is carried out at a temperature of about 50° C. to about 90° C. in a pH range of approximately 6.0 to 10.0 and said enzyme is derived from [an] *said* Arthorobacter microorganism grown in a nutrient medium containing xylose or xylan.

13. A process according to claim 8 in which the incubation is carried out at a temperature of about 50° C. to about 90° C. in a pH range of approximately 6.0 to 10.0 and said enzyme is derived from [an] *said* Arthrobacter micro-organism grown in a glucose-containing nutrient medium in the absence of xylose or xylan.

14. A process according to claim 12 in which the micro-organism is Arthrobacter nov. sp. [NRRL B-3724 or NRRL B-3725 or NRRL B-3726 or] NRRL B-3727 [or NRRL B-3728].

15. A process according to claim 13 in which the micro-organism is NRRL B-3726.

16. A process according to claim 13 in which the micro-organism is Arthrobacter nov. sp. NRRL B-3727.

[17. A process according to claim 13 in which the micro-organism is Arthrobacter nov. sp. NRRL B-3728.]

* * * * *

UNITED STATES PATENT AND TRADEMARK OFFICE

CERTIFICATE OF CORRECTION

PATENT NO. : Re. 29,690

DATED : July 4, 1978

INVENTOR(S) : Chin K. Lee

It is certified that error appears in the above-identified patent and that said Letters Patent are hereby corrected as shown below:

Column 8, line 25, after "is" insert -- Arthrobacter nov. sp. --

Signed and Sealed this

*Nineteenth* Day of *December 1978*

[SEAL]

*Attest:*

RUTH C. MASON
*Attesting Officer*

DONALD W. BANNER
*Commissioner of Patents and Trademarks*